US011655547B2

(12) United States Patent
Kazadi

(10) Patent No.: US 11,655,547 B2
(45) Date of Patent: *May 23, 2023

(54) METHOD FOR GENERATING CLEAN WATER, HYDROGEN, AND OXYGEN FROM CONTAMINATED EFFLUENT

(71) Applicant: Sanza T. Kazadi, Batavia, IL (US)

(72) Inventor: Sanza T. Kazadi, Batavia, IL (US)

(*) Notice: Subject to any disclaimer, the term of this patent is extended or adjusted under 35 U.S.C. 154(b) by 70 days.

This patent is subject to a terminal disclaimer.

(21) Appl. No.: 17/332,811

(22) Filed: May 27, 2021

(65) Prior Publication Data

US 2021/0285112 A1   Sep. 16, 2021

Related U.S. Application Data

(63) Continuation-in-part of application No. 16/389,560, filed on Apr. 19, 2019.

(60) Provisional application No. 62/659,709, filed on Apr. 19, 2018.

(51) Int. Cl.
| | |
|---|---|
| *C02F 1/16* | (2023.01) |
| *C02F 1/44* | (2023.01) |
| *C02F 1/20* | (2023.01) |
| *C25B 1/04* | (2021.01) |
| *C25B 15/08* | (2006.01) |

(52) U.S. Cl.
CPC ............ *C25B 1/04* (2013.01); *C02F 1/16* (2013.01); *C02F 1/20* (2013.01); *C02F 1/445* (2013.01); *C25B 15/08* (2013.01)

(58) Field of Classification Search
CPC .............. B01D 5/006; B01D 61/002; B01D 2311/2669; C02F 1/445; C02F 1/461; C21B 1/04
See application file for complete search history.

(56) References Cited

U.S. PATENT DOCUMENTS

| | | | |
|---|---|---|---|
| 8,282,812 B2 | 10/2012 | Burtch | |
| 9,751,078 B2 | 9/2017 | Yoo et al. | |
| 2014/0158623 A1* | 6/2014 | Pudil | A61M 1/3486 |
| | | | 210/96.2 |
| 2016/0002074 A1* | 1/2016 | Benton | B01D 61/58 |
| | | | 210/636 |
| 2017/0210656 A1* | 7/2017 | Hancock | B01D 61/58 |
| 2019/0323132 A1* | 10/2019 | Kazadi | C02F 1/461 |

* cited by examiner

*Primary Examiner* — Bradley R Spies
(74) *Attorney, Agent, or Firm* — Invent Capture, LLC.; Samuel S. Cho

(57) ABSTRACT

One or more novel processes for producing hydrogen, oxygen, and in some cases, distilled and cleaned water from a contaminated effluent, are disclosed. In one example of utilizing this novel process, the water from contaminated effluent is transferred into a draw solution using an entrochemical system through a vapor-mediated membrane-free forward osmosis process. The process is enabled by the generation of a wet vacuum in one or more entrochemical cells incorporated into the entrochemical system. This process generates a diluted draw solution that can be utilized as an abundant water feedstock in an electrolyzer for electrolysis, which in turn generates hydrogen and oxygen. In some embodiments, an entrochemical distiller may also be utilized to distill a portion of the contaminated effluent for clean water as a result of thermal transfers during the vapor-mediated membrane-free forward osmosis process.

13 Claims, 4 Drawing Sheets

An Embodiment of an Entrochemical Cell

500

Process Diagram for an Entrochemical System to Acquire Water From a Contaminated Effluent to Enable Subsequent Electrolysis in an Electrolyzer

100

Process Diagram for an Entrochemical Distiller to Acquire Water From a Contaminated Effluent & Generating Two Product Streams (i.e. Distilled Water Stream & Input Stream to the Electrolyzer)

200

An Embodiment of an Entrochemical Water Transfer and Recovery Device

300

An Embodiment of an Entrochemical Distiller Device

400

An Embodiment of an Entrochemical Cell

500

METHOD FOR GENERATING CLEAN WATER, HYDROGEN, AND OXYGEN FROM CONTAMINATED EFFLUENT

RELATED APPLICATIONS

The present application is a continuation-in-part (CIP) application to a US non-provisional application, U.S. Ser. No. 16/389,560, which was filed on Apr. 19, 2019. U.S. Ser. No. 16/389,560 has claimed priority to a provisional application, U.S. 62/659,709, which was filed on Apr. 19, 2018. The contents of U.S. 62/659,709 and U.S. Pat. No. 16,389,560 are fully incorporated by reference to the present application.

FIELD OF THE INVENTION

The present invention relates to a process for extracting water from contaminated liquids and using the water to produce hydrogen and oxygen. The present invention also relates to coupling a secondary process to the water extraction process which itself recovers distilled water from a contaminated effluent.

BACKGROUND OF THE INVENTION

Hydrogen and oxygen are highly-reactive elements that typically react with various elements and compounds. These two elements, when combined, also react energetically with each other. Together they can form a highly explosive mixture that can serve as a fuel, a rocket propellant, and an energy storage medium. Hydrogen is used in various fields, with applications in chemicals, energy, and food industries, for example. Many of the reactions with hydrogen can form stable compounds that are difficult to change. An example of such a stable compound is water ($H_2O$), a universal solvent essential for life on Earth.

Cost effective methods of producing hydrogen have long been sought for energy applications including production of hydrogen to be used as a fuel for automobiles and other transportation devices, and as an energy storage for intermittent power generators. Hydrogen delivers an excellent energy density to weight ratio; according to the US Department of Energy, the energy density of hydrogen gas is 120 MJ/kg, which is nearly three times that of gasoline (i.e. 44 MJ/kg). Importantly, hydrogen combustion with oxygen generates water vapor, which makes it a substance that, when used, does not significantly add to the carbon footprint associated with conventional fossil fuel combustion.

Two major methods of creating hydrogen gas at an industrial scale exist in the modern economy. One of these methods is called methane reforming. This process involves pumping high-temperature steam into methane gas. At temperatures of 200° C., the high-temperature water vapor converts the methane gas into hydrogen gas and carbon dioxide. While this does have the advantage of being very cost effective and enabling industrial scaling, it suffers from a number of disadvantages. First, the conventional methane reforming process creates $CO_2$ gas, which is a potentially environmentally-damaging waste product that may require further processing in order to limit its detrimental environmental impact. Second, the supply of hydrogen is limited by the amount of methane. In 2014, the US Department of Energy estimated that the entire worldwide annual production of methane was merely 9 million metric tons, which suggests that the relatively scarce methane is ill-prepared for a widespread adoption of hydrogen fuel-based economy.

Moreover, as the use of methane as a fuel stock for electricity production increases, that use of methane competes with the use in hydrogen production.

The second method of creating hydrogen originates from a utilization of electrolysis. Electrolysis involves directing electrical current into a water solution containing an electrolyte. Beyond a voltage of 1.23V, the water begins separating. Depending on the electrolyte, the system generates hydrogen, oxygen, and other contaminants including oxidation products at the anode. At low voltages and currents, electrolysis produces only oxygen and hydrogen, because producing other potential byproducts generally requires larger voltages and related currents in order to operate properly. In some instances, the use of higher-magnitude voltages in hydrogen production is limited due to the often-undesirable increase in other electrolysis byproducts at such higher-magnitude voltages.

Despite its drawbacks, a major advantage of electrolysis is the abundance of water as its feedstock for hydrogen production, unlike the methane reforming process, which is bottlenecked by the relatively scarce methane. It may therefore be feasible in the future to utilize an industrial-scale electrolysis infrastructure to provide sufficient hydrogen to address the needs of hydrogen-powered fuel cell vehicles, hydrogen-powered cars, and/or other hydrogen-powered environmentally-friendly machines with minimal carbon footprints.

Unfortunately, major technical challenges have historically stood between the electrolysis-based hydrogen economy and the current state of affairs. For example, the lack of economically-viable cheap electricity in hydrogen production to compete cost effectively against other types of fuels has hampered a widespread adoption of the hydrogen economy. In order to create hydrogen from water using electrolysis, it is necessary for the required electricity to be sufficiently cheap, compared to the cost of producing other types of fuels or hydrogen in other ways (e.g. methane reforming processes). In recent years, various methods of on and off-grid electricity generation involving solar and wind power have made electrical supplies to electrolysis devices and facilities more economically viable.

Another challenge to the emerging hydrogen economy is the need for relatively clean water supplies in order to run an electrolysis process. Earth's most abundant water source—the oceans—are not clean enough to use as feedstock for modern electrolyzers. This is a result of the tendency of the electrolyzers to produce chlorine gas, hypochlorite, and perchlorate when electrolyzing ocean water. These substances are significantly toxic if released to surrounding environments during or following an electrolysis process. Additionally, ocean water significantly corrodes the electrolyzers, making their long-term viability questionable. Therefore, using raw ocean water has not been a viable solution for electrolysis. Similarly, utilizing large amounts of inland brackish water or industrial waste water in a conventional electrolysis process is also environmentally detrimental and undesirable, though the substances generated may be different.

One way of mitigating the emissions of chlorine at the anode of a conventional electrolyzer is to use specialized materials. Materials are under development that, when utilized as the anode material, do not generate secondary substances at the anode. These materials create only oxygen at the anode due to their specialized chemical structure. Materials that can be stable at high current densities may be particularly desirable for this purpose. While research into discovering such suitable specialized materials is ongoing, no material has yet been identified and validated in a scalable large-scale production at competitive prices relative to other known forms of hydrogen generation. In fact, research to develop such materials has been underway for more than twenty years, and the problem has yet to be solved despite intense investigation in various laboratories. It is uncertain whether this problem can be solved in the short term by using a material science approach.

For the reasons stated above, the conventional electrolysis resorted to using relatively clean water supplies. This means that the conventional electrolysis requires using either fresh water or reclaimed and processed water that was previously contaminated. Unfortunately, using fresh water as a feedstock to the electrolysis-based hydrogen production in the massive quantities necessary to enable transportation and energy storage is unlikely to succeed due to the deleterious effect on the amount of potable water available for other purposes. With supplies of potable water coming under increasing pressure from the effects of climate change, rapidly depleting underground supplies, contamination of existing supplies of potable water, and growing human populations, it may be unrealistic to expect a freshwater feedstock to be utilized in a massive worldwide industrial scale hydrogen production in the future hydrogen-based economy.

U.S. Pat. No. 8,282,812 discloses an apparatus for producing hydrogen from salt water by electrolysis. This device utilizes at least one zinc anode plate and at least one aluminum cathode plate. The metal plates are submerged in the salt water, and electrifying them generates the electrolysis. The device generates hydrogen at the cathode. The salt, separated into $Na^{2+}$ and $Cl^-$ ions in solution, now interacts with the anode. The chlorine ions are transformed into chlorine at the anode. As a result, the anode is consumed by being transformed to zinc (II) chloride in the process if the voltage is raised so as to create a high current density. At lower current densities, the system cannot viably be used as a method of generating industrial-quantity hydrogen.

U.S. Pat. No. 9,751,078 discloses a material class formed as nanoparticles with the formula CoX/C, where X is selected from one of the group of elements (P, O, B, S, and N) with an amorphous layer between 0.1 nm and 7 nm made from Co, X, and O. This material is used as the anode and the cathode, which are intended to operate in an alkaline environment. Yet, it is not clear that this material can be used in a salt water environment or environment provided by other contaminated water supplies.

Furthermore, current methods of processing and transforming oceanic or industrial wastewater as a suitable feedstock for electrolysis are prohibitively expensive, both energetically and economically. For example, a conventional membrane-based desalination process is typically dependent on cogeneration with power plants, using the waste heat from the power plants to enable the process. This restrictive dependency on power plants in the conventional membrane-based desalination process is difficult to scale up inexpensively to enable a ubiquitous global-scale hydrogen production from electrolysis.

Therefore, it may be advantageous to devise a novel system and a related method of operating the novel system to utilize oceanic, brackish, and/or industrial wastewater resources as abundant and inexpensive feedstocks to electrolysis-based hydrogen production. In addition, it may also be advantageous to devise a novel method of utilizing oceanic, brackish, and/or industrial wastewater resources for hydrogen production without creating environmentally harmful byproducts, such as hypochlorite and perchlorate, by enabling the use of high electrical currents during electrolysis.

Osmosis is a well-researched process that has applications and consequences in a wide variety of areas, including biological and engineering processes. The general process involves two aqueous solutions reservoirs that are in contact through a selectively-permeable separation medium. This separation medium enables water to move freely between the two reservoirs but limits the movement of any dissolved solutes. When the water solutions in the two reservoirs have two different solute concentrations, they are at different chemical potentials. In order to move the system to chemical equilibrium, the water flowing between the two reservoirs preferentially moves from the reservoir containing solution at lower concentration to the reservoir containing solution at higher concentration. This tends to dilute the higher concentration solution while concentrating the lower concentration solution. When the two systems are separated by a semi-permeable membrane, which allows water to preferentially move between the two bodies of water, this forward osmosis process tends to bring the system to a state of equal concentrations between the two bodies.

A largely overlooked mechanism for the forward osmosis process is one in which the separation medium is a water vapor-filled space between the two reservoirs. In this situation, the water may move between the two reservoirs but the dissolved nonvolatile solutes may not. This is called vapor-mediated membrane-free forward osmosis ($VM^2F^2O$). When this process occurs, the water carries the heat of vaporization from the lower concentration water reservoir and deposits it in the higher concentration water reservoir, leading to a difference in temperature. The lower concentration solution is called the source solution, while the higher concentration solution is called the draw solution.

In a $VM^2F^2O$ process, the water condenses at the surface of the draw solution. Since the physics of this osmosis happens at the surface of the two solutions, if the water condensing at the surface, which does not naturally mix well with the solution below, has a low dissolved solute concentration, this tends to cause the osmosis to slow and eventually stop. Therefore, the draw solution must be mixed in order for this osmosis process to be continue.

The advantage of the $VM^2F^2O$ process is that neither membrane degradation nor leakage is a concern in this osmosis process, because it does not use a membrane. The main disadvantage involves the need to continually mix the water, which can cost energy when performed with a separate independent mixing mechanism. However, if the mixing mechanism is powered by the movement of the water itself, the process can be used to transfer pure water without a purification step from an effluent of relatively lower concentration to a higher concentration solution.

The thermal gradient will also tend to stop the water transfer process, shifting the chemical potentials closer to one-another. A second process must therefore be utilized to reduce the thermal gradient between the two sides in order to restore the movement of water. This can be any retrograde process that moves heat from the warmer stage back to the colder stage. Several processes may be able to achieve this spontaneous heat movement. For example, a distillation process may be created to achieve the movement of heat backward. Another method is to construct the cold and warm reservoirs so that they share at least one two-dimensional boundary, which enables rapid heat transfer between the two reservoirs. A device comprising two reservoirs with a first reservoir containing a relatively low concentration effluent and a second reservoir containing a relatively high concentration solution, wherein the two reservoirs share at least one two-dimensional boundary to enable rapid heat transfer between the reservoirs, is called an "entrochemical amplifier," or an "entrochemical water transfer device."

In some cases, diluting the draw solution can be a desirable primary objective, because the draw solution itself may be utilized in a useful secondary process. In such instances, the water is drawn from the source solution into the draw solution. A fast way to achieve this process is utilizing a system in which the two reservoirs share a thermally-conductive common boundary or boundaries. This may be implementable if the draw solution is an electrolyzable solution, such as NaOH or KOH, and the source solution is ocean water or industrial effluent, when at least one objective is to obtain water for electrolysis.

Therefore, it may be advantageous to develop a device that utilizes a $VM^2F^2O$ process to move water from a contaminated effluent into a draw solution, which may also be electrolyzable.

One of the key necessary operating conditions enabling a $VM^2F^2O$ process is maintaining a wet vacuum within the chamber. A wet vacuum is a state in which a majority of the air in the system is the vapor state of the solvent in the draw and the source solutions. In this state, most of the air has been forced out of the chamber.

One key aspect of the solution and effluent used in the system is that they do not contain dissolved air. Under most circumstances, liquid in contact with air will absorb and dissolve some amount of air and hold the dissolved air inside the liquid. When the liquid is exposed to a vacuum, dissolved air emerges from the solution, filling the vacuum with air. This transformation, in time, influences the vacuum sufficiently to reduce or stop the movement of water between the two reservoirs. Therefore, it may be of critical importance to degas the liquids, which in turn removes the air and ensures that the device continues to operate as intended for an extended period.

An expansion-based degasser allows a degassed liquid to be subjected to vacuum, which is generated by filling a chamber with the liquid and sealing it and expanding the volume of the chamber. The pressure in the chamber rapidly drops to the partial pressure of the liquid in the chamber. A subsequent process may be utilized to assist the air dissolved in the chamber to come out of solution rapidly. The degasser enables an emerging column of air to be physically separated from the water, when it is extracted from the solution.

Therefore, it may be advantageous to develop a novel process to enable acquisition of water from a contaminated effluent for the purposes of carrying out electrolysis with a system that integrates a degasser to processes the effluent and the draw solution before insertion of the liquids in an entrochemical system.

Moreover, it may be desirable to utilize the thermal gradient produced by the transfer of vapor from a first effluent to a draw solution to drive the distillation of water on its own. A module that accomplishes this thermal gradient-based distillation process is called an "entrochemical distiller module." An entrochemical distiller module typically comprises four chambers: a first effluent chamber, a draw solution chamber, a second effluent chamber, and a condenser. The first effluent chamber and the draw solution chamber are connected via a vapor pathway that enables vapor to transfer freely between them. Similarly, the second effluent chamber and the condenser are connected via a vapor pathway that enables vapor to transfer freely between them. The first effluent chamber and the condenser are configured to accommodate convenient heat transfer between them. The draw solution chamber and second effluent chamber are also thermally linked, which keeps their operating temperatures at similar levels between the two.

Once a wet vacuum is established in both connected pairs of chambers, the entrochemical distiller module can transition to an operational stage. During operation, vapor evaporates from the first effluent in the first effluent chamber, thereby carrying the heat of vaporization away from the first effluent and reducing its temperature. The vapor then condenses on the draw solution, which delivers the heat of vaporization from the first effluent solution. This heat can warm the second effluent in the second effluent chamber. Some portion of the second volume of effluent vaporizes and travels as vapor to the condenser. The vapor subsequently condenses, and its heat of vaporization transfers back into the first effluent and drives the transfer of the first effluent. This process not only enhances the rate of liquid transfer from the first effluent into the draw solution by reducing the thermal gradient, but also produces a content of distilled liquid from the second effluent.

Furthermore, it may also be advantageous to devise a novel process to enable electrolysis of contaminated water supplies through an energetically low-cost solution, which is not limited in deployment locations by co-generation requirements.

SUMMARY

Summary and Abstract summarize some aspects of the present invention. Simplifications or omissions may have been made to avoid obscuring the purpose of the Summary or the Abstract. These simplifications or omissions are not intended to limit the scope of the present invention.

In one embodiment of the invention, a method for producing hydrogen and oxygen from an effluent is disclosed. This method comprises the steps of: (1) using a degasser to degas the effluent and a draw solution; (2) transferring water from the effluent to a concentrated draw solution by creating a wet vacuum within each entrochemical amplifier containing the effluent and the concentrated draw solution with a higher solute concentration than the effluent in one or more entrochemical amplifiers which are part of an entrochemical water transfer and recovery device, wherein the effluent is placed in an effluent chamber and the concentrated draw solution is placed in a draw solution chamber per each entrochemical amplifier, and wherein the water in the effluent transfers into the concentrated draw solution spontaneously once the wet vacuum is established within each entrochemical amplifier through a vapor-mediated membrane-free forward osmosis process, which is enhanced in some cases by mechanical agitation of the concentrated draw solution; (3) generating a diluted draw solution containing condensed water vapors from the effluent through vaporization of water from the effluent and condensation of water vapors into the concentrated draw solution in the wet vacuum created within each entrochemical cell; (4) transferring the diluted draw solution produced by the entrochemical water transfer and recovery device to the electrolyzer connected to the entrochemical water transfer and recovery device; (5) generating hydrogen and oxygen through electrolysis in the electrolyzer with the diluted draw solution originating from the entrochemical water transfer and recovery device; and (6) transferring the concentrated draw solution from the electrolyzer back to the degasser.

Moreover, in another embodiment of the invention, a method for producing distilled water, hydrogen, and oxygen from an effluent is disclosed. This method comprises the steps of: (1) using a degasser to degas the effluent and a draw solution; (2) moving the effluent from the degasser into first and second effluent chambers, and draw solution from the degasser into a draw solution chamber in each of one or more entrochemical distiller modules; (3) transferring water from the effluent by creating a wet vacuum within each of one or more entrochemical distiller modules of an entrochemical water recovery and distiller device, wherein the wet vacuum assists a vapor-mediated membrane-free forward osmosis-based transfer of water in the effluent of each entrochemical distiller module into a concentrated draw solution of each entrochemical distiller module; (4) generating a diluted draw solution, as a first product stream of the entrochemical water recovery and distiller device, wherein the diluted draw solution contains additional water drawn from the effluent through vaporization from the effluent and condensation of water vapors into the concentrated draw solution; (5) generating distilled water, as a second product stream of the entrochemical water recovery and distiller device, using thermal gradients developed in each of one or more entrochemical distiller modules as a result of a vapor-mediated membrane-free forward osmosis ($VM^2F^2O$) process in each entrochemical distiller module to vaporize water in the second effluent chamber and the condensation of the water in a condenser chamber of each of one or more entrochemical distiller modules; (6) transferring the diluted draw solution produced by the entrochemical water recovery and distiller device to an electrolyzer connected to the entrochemical water recovery and distiller device; (7) generating hydrogen and oxygen through electrolysis in the electrolyzer with the diluted draw solution originating from the entrochemical water recovery and distiller device; and (8) transferring the concentrated draw solution from the electrolyzer to the degasser.

DETAILED DESCRIPTION

Figure 1:
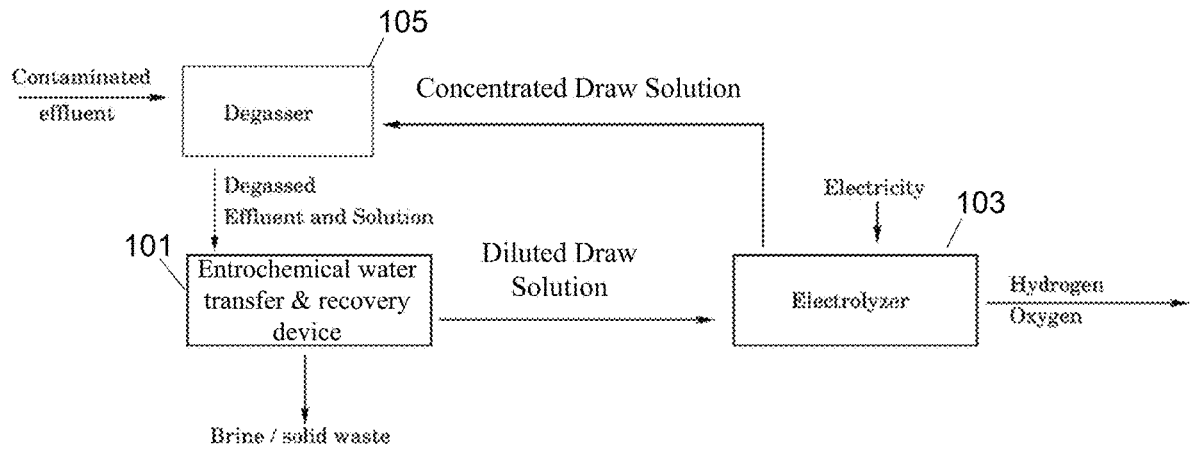
FIG. 1 shows a process diagram for utilizing an entrochemical system to acquire water from a contaminated effluent to enable subsequent electrolysis in an electrolyzer, in accordance with an embodiment of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

The detailed description is presented largely in terms of procedures, logic blocks, processing, and/or other symbolic representations that directly or indirectly resemble a novel apparatus or a method of operating the novel apparatus for transforming an effluent (e.g. water from a contaminated supply) into distilled water, hydrogen, and/or oxygen, wherein the novel apparatus is typically related to an entrochemical system and/or an electrolyzer device. These process descriptions and representations are the means used by those experienced or skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the Specification are not necessarily all referring to the same embodiment. Furthermore, separate or alternative embodiments are not necessarily mutually exclusive of other embodiments.

One objective of an embodiment of the present invention is to provide a novel entrochemical system and a related method of operating the novel entrochemical system to utilize oceanic, brackish, and/or industrial wastewater resources as abundant and inexpensive feedstocks to electrolysis.

Another objective of an embodiment of the present invention is to provide a novel process to enable electrolysis of contaminated water supplies through an energetically and economically low-cost solution, which is not limited in deployment locations by co-generation requirements.

Yet another objective of an embodiment of the present invention is to provide a novel method of utilizing oceanic, brackish, and/or industrial wastewater resources for hydrogen production without creating environmentally harmful byproducts, such as hypochlorite and perchlorate, by separating the water from dissolved solutes and thereby enabling the use of high electrical currents during electrolysis without the creation of harmful byproducts.

Figure 5:
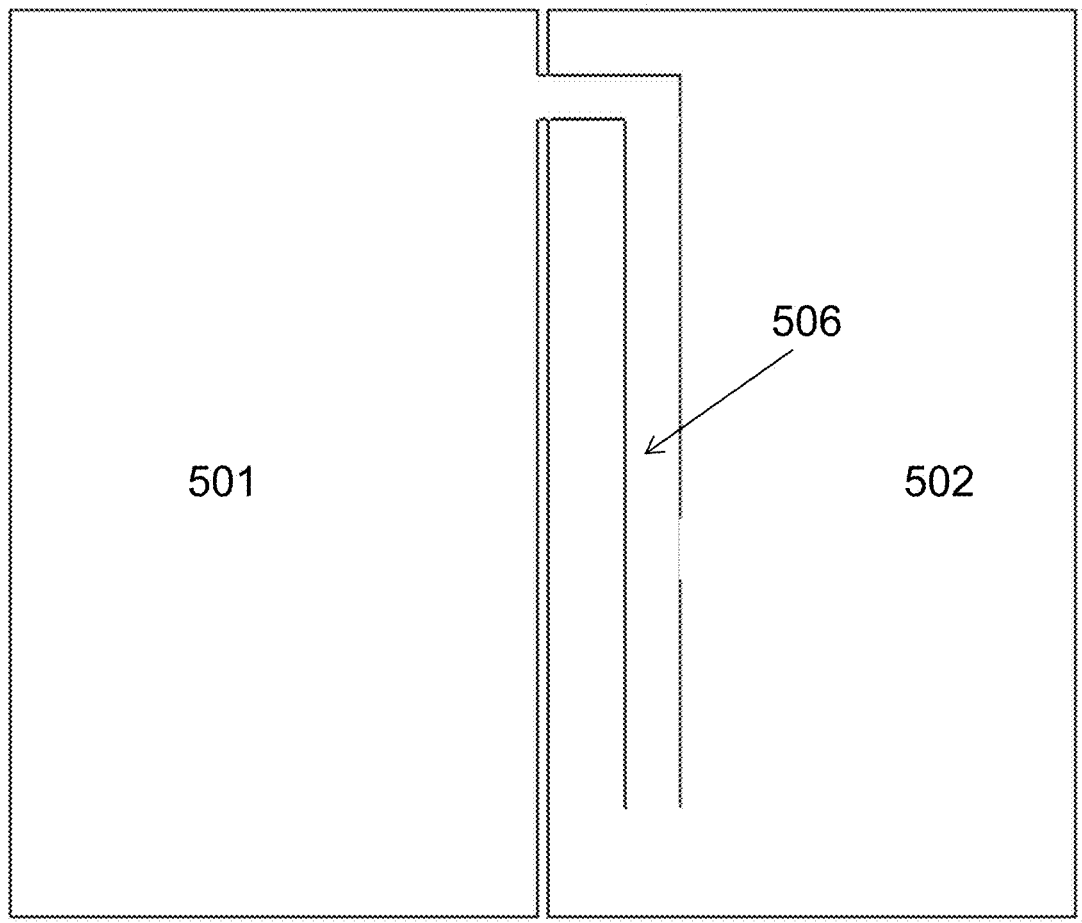
FIG. 5 shows an embodiment of an entrochemical cell, in accordance with an embodiment of the invention.

FIG. 5 shows an embodiment of an entrochemical cell (500), in accordance with an embodiment of the invention. The entrochemical cell (500) is a passive heat pump that employs a wet vacuum. A wet vacuum is a state wherein virtually all of the air has been removed from a closed vessel and replaced with the vapor state of the solvent of some solution or quantity of pure liquid solvent contained within. The entrochemical cell (500) is a device comprising two hermetically-sealed separate chambers known as the effluent chamber (501) and the draw solution chamber (502) connected by a vapor transfer channel (506). The draw solution chamber (502) additionally contains a liquid agitation element which agitates the liquid in the draw solution chamber (502) to assist intended thermal transfers. In some embodiments of the entrochemical cell, the end of the vapor transfer channel (506) doubles as a liquid agitation element, eliminating the need for another discrete element. This configuration is illustrated in FIG. 5.

When a wet vacuum is established inside the entrochemical cell (500), the solvent moves spontaneously from the less concentrated solution contained in the effluent chamber (501) into the more concentrated solution contained in the draw solution chamber (502) by vaporizing solvent from the less concentrated solution (effluent solution) and condensing the solvent vapor into the more concentrated solution (draw solution).

Importantly, the solvent transfer occurring inside the entrochemical cell (500) also transfers the heat of vaporization between the two solutions, which in turn enables the formation of a thermal gradient between the effluent chamber (501) and the draw solution chamber (502). The liquid agitation element (506) enhances the speed of solvent (e.g. water) transfer as well as the size of the resulting thermal gradient, as continuous or periodic agitations of liquid solution(s) limit a clean "skin" formation of pure solvent(s) on the surface of the draw solution. Depending on capacity and throughput requirements of an entrochemical water transfer and recovery device, a plurality of entrochemical cells may be nested, embedded, and/or linked to constitute a high-capacity and industrial-scale entrochemical device.

In the context of describing various embodiments of the present invention, a device that utilizes at least one entrochemical cell to operate as an entrochemical water transfer and recovery device (e.g. 101 in FIG. 1, 201 in FIG. 2), an entrochemical water transfer and/or recovery device (e.g. 300 in FIG. 3), or an entrochemical distiller (e.g. 400 in FIG. 4) is referred to as an "entrochemical device."

When an entrochemical device is structured as a plurality of embedded chambers comprising a plurality of individual entrochemical cells (i.e. multiple instances of element 500 in FIG. 5), the device constitutes an "entrochemical solvent transfer device." The entrochemical solvent transfer device is configured to transfer solvents contained in one or more chambers of the individual entrochemical cells from lower to higher concentrations while returning the transferred heat of vaporization from the higher concentration solution to the lower concentration solution through common boundaries and/or common contact areas among the plurality of chambers in the individual entrochemical cells.

In one embodiment of the invention, an "entrochemical thermal battery" can be created by arranging a plurality of entrochemical cells in a functionally linear arrangement. In a functionally-linear arrangement, each of N entrochemical cells may be labeled by unique numbers 1 through N. Unit i is arranged so that its draw solution chamber is at least partially contained within or in thermal contact with the effluent chamber of unit (i+1). Note that the Nth cell's draw solution chamber is not connected to the (N+1)th cell's effluent chamber as there is no (N+1)th cell. The effluent chamber of cell 1 and the draw solution chamber of cell N are not necessarily connected to any other entrochemical cell. When the effluent chamber of cell 1 is in thermal contact with or at least partially contains the draw solution chamber of cell N, the device is known as an entrochemical thermal ring.

FIG. 1 shows a process diagram (100) for utilizing an entrochemical system to acquire water from a contaminated effluent to enable subsequent electrolysis in an electrolyzer, in accordance with an embodiment of the invention. The entrochemical system in this embodiment comprises an entrochemical water transfer and recovery device (101), a degasser (105), and an electrolyzer unit (103), with pipes or conduits to transfer liquids among these units. The entrochemical water transfer and recovery device (101) incorporates one or more entrochemical cells, which have been previously described and illustrated in association with FIG. 5. Furthermore, in a preferred embodiment of the invention, the entrochemical water transfer and recovery device (101) may incorporate an internal structure of an exemplary entrochemical water transfer and recovery device (300) of FIG. 3.

As illustrated in FIG. 1, the degasser (105) takes a contaminated effluent and degasses the contaminated effluent to generate a degassed effluent and a degassed concentrated draw solution, which are then fed into the entrochemical water transfer and recovery device (101) as a degassed feedstock liquid. The entrochemical water transfer and recovery device (101) then generates a diluted draw solution as a result of a novel entrochemical process that moves water contained in the contaminated effluent into the concentrated draw solution while also providing thermal transfers within one or more entrochemical cells contained in the entrochemical water transfer and recovery device (101). The degasser (105) then receives a concentrated draw solution from the electrolyzer unit (103), which generates another batch of a degassed effluent and solution for the entrochemical water transfer and recovery device (101). This process can be executed repeatedly as a draw solution feedback loop for accommodating continuous entrochemical processes within the entrochemical water transfer and recovery device (101).

The liquid concentration differences between the contaminated effluent feedstock and the concentrated draw solution looped back into the entrochemical water transfer and recovery device (101) from the electrolyzer (103) enables the entrochemical cell(s) and/or amplifier(s) in the entrochemical water transfer and recovery device (101) to drive the entrochemical process involving liquid and thermal energy transfers, which in turn generate the diluted draw solution and separate brine and/or solid wastes from the processed contaminated effluent. In one embodiment of the invention, the separation of brine and/or solid wastes may also involve particulate filtering assisted by gravity and/or motorized liquid agitations.

As shown in the process diagram (100) in FIG. 1, the diluted draw solution outputted by the entrochemical water transfer and recovery device (101) is then fed into the electrolyzer unit (103), which performs electrolysis with supplied electricity to transform a quantity of the water in the diluted draw solution into hydrogen and oxygen. The process of electrolyzing the diluted draw solution largely consumes the transferred water content in the diluted draw solution, thus concentrating the remaining liquid in the electrolyzer unit (103). This concentrated remaining liquid is eventually fed back into the entrochemical water transfer and recovery device (101) after undergoing a degassing process in the degasser (105) to enable the entrochemical process continuously with the incoming contaminated effluent, as shown in the process diagram (100).

Furthermore, in the preferred embodiment of the invention, the entrochemical water transfer and recovery device (101) utilizes a vapor-mediated membrane-free osmosis process to transfer water from the contaminated effluent to a secondary supply (i.e. the concentrated draw solution). The energy utilized in generating the hydrogen and oxygen in the electrolyzer unit (103) also creates a state of lower entropy in the more concentrated draw solution. This concentrated draw solution, when fed back into the entrochemical water transfer and recovery device (101) as shown in the process diagram (100), enables acquisition of the water from the contaminated effluent. Movement of water from the contaminated effluent into the looped-back concentrated draw solution increase the overall entropic state in the entrochemical cell(s) (i.e. also called "entrochemical amplifiers") in the entrochemical water transfer and recovery device (101). Therefore, the entrochemical system embodied in the process diagram (100) of FIG. 1 does not require an external extra energy other than environmental thermal energy to overcome the loss of the heat of mixing for water acquisition and processing from the contaminated effluent; the energy required to drive the entire process is ultimately provided by the energy supplied to the electrolyzers.

Figure 3:
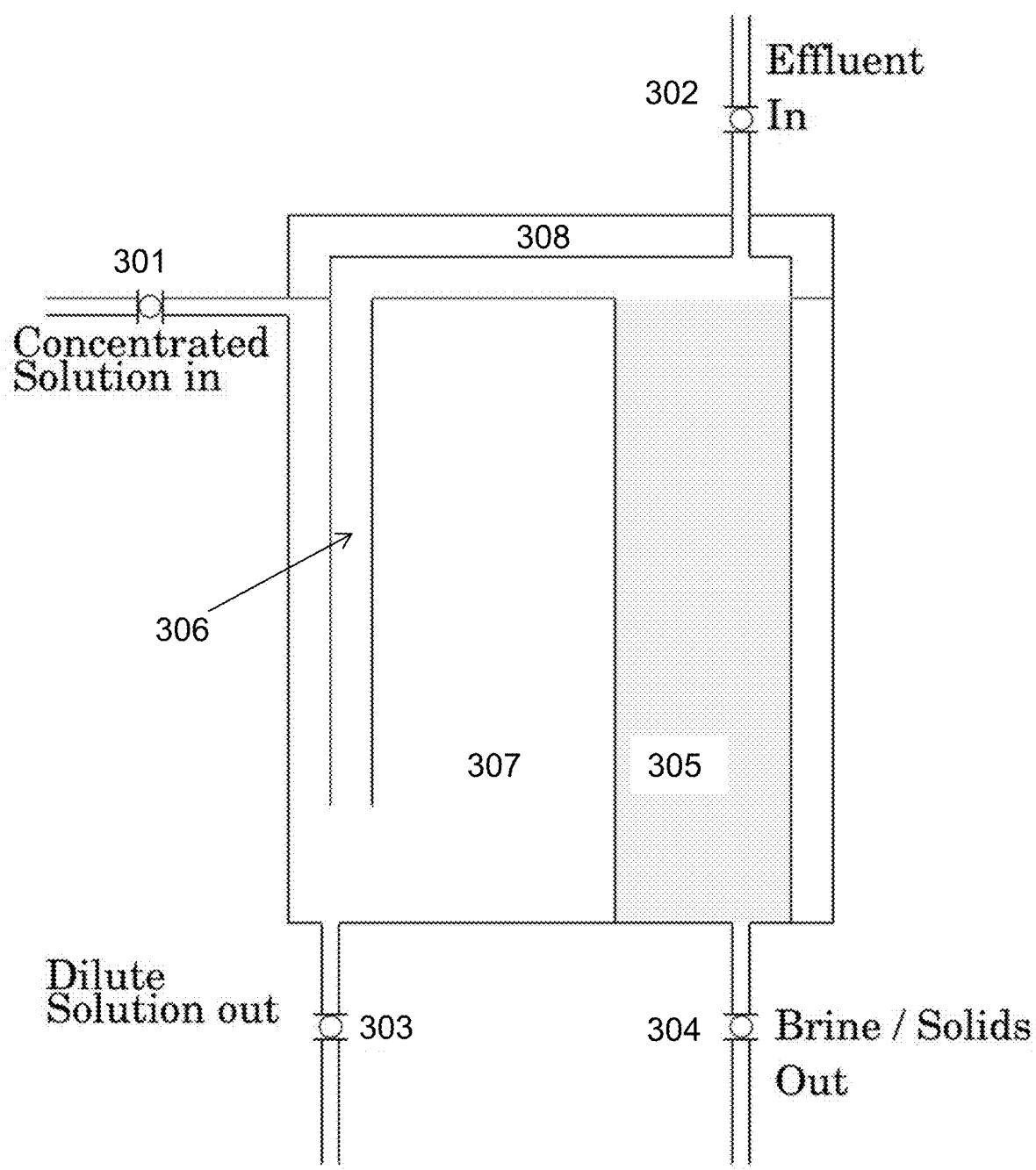
FIG. 3 shows an embodiment of an entrochemical water transfer and recovery device, in accordance with an embodiment of the invention.

FIG. 3 shows an embodiment of an entrochemical water transfer and recovery device (300), in accordance with an embodiment of the invention. The entrochemical water transfer and recovery device (300) comprises a first draw solution chamber (307) and a second effluent chamber (305) completely separated from one another. The draw solution chamber (307) and the effluent chamber (305) are physically connected by a vapor transfer channel (306), as shown in FIG. 3 and the entire device is capable of being hermetically sealed. One or more liquid agitation elements may be incorporated into the draw solution chamber (307) to mix the draw solution therein. As shown in FIG. 3, the liquid agitation element can be the vapor transfer channel (306) itself when it is constructed as a vapor injector wherein the aperture through which water vapor enters the draw solution chamber (307) is located below the surface of the draw solution contained therein.

As shown in FIG. 3, the entrochemical water transfer and recovery device (300) contains an entrochemical cell structure with the two chambers (307, 305). The entrochemical cell acts as a passive heat pump that employs a wet vacuum or a similar condition, wherein virtually all of the air has been removed from a closed vessel and replaced with the vapor state of the solvent of the draw solution and effluent. The two chambers (305, 307) in the entrochemical water transfer and recovery device (300) are hermetically-sealed and connected by the vapor transfer channel (306).

Furthermore, the entrochemical water transfer and recovery device (300) in FIG. 3 also includes an effluent input pipe (302) that draws in external oceanic, brackish, and/or industrial water supplies into the entrochemical cell structure, and a draw solution input pipe (301) that receives the draw solution either from an external source or generated by an electrolyzer (e.g. 103 in FIG. 1) during electrolysis. The entrochemical water transfer and recovery device (300) further incorporates a dilute solution output pipe (303) that transmits a diluted draw solution out of the draw solution chamber. In addition, the entrochemical water transfer and recovery device (300) also includes a brine and/or solids output pipe (304) that drains concentrated effluent from the entrochemical cell and/or amplifier structure.

When a wet vacuum is created within the entrochemical cell structure of the entrochemical water transfer and recovery device (300), the solvent moves spontaneously from the effluent solution into the more concentrated draw solution by vaporizing from the effluent, moving through the vapor passageway (306), and moving into the draw solution through the vapor transfer channel configured as a vapor injector (306).

Importantly, the solvent transfer occurring inside the entrochemical cell structure also transfers the heat of vaporization between the two solutions, which in turn enables the formation of a thermal gradient between the two hermetically-sealed separate chambers (307, 305). A liquid agitation element, if utilized, further enhances the speed of liquid solution transfer as well as the size of the resulting thermal gradient, as continuous or periodic agitations of the liquid solution limit a clean "skin" formation of pure solvent on the surface of the draw solution. Moreover, depending on capacity and throughput requirements of the entrochemical water transfer and recovery device (300), a plurality of entrochemical cells may be utilized to constitute a high-capacity and industrial-scale entrochemical device.

In a preferred embodiment of the invention, the vapor transfer channel (306) may contain a turbine. As the vapor moves from the effluent chamber (305) to the draw solution chamber (307), it passes the turbine, imparting some of the momentum contained within the moving fluid to the turbine and causing it to turn. The turning of the turbine can be used to provide information about the vapor flow, generate electricity, mechanically move a connected apparatus, otherwise utilize the imparted mechanical energy.

Figure 2:
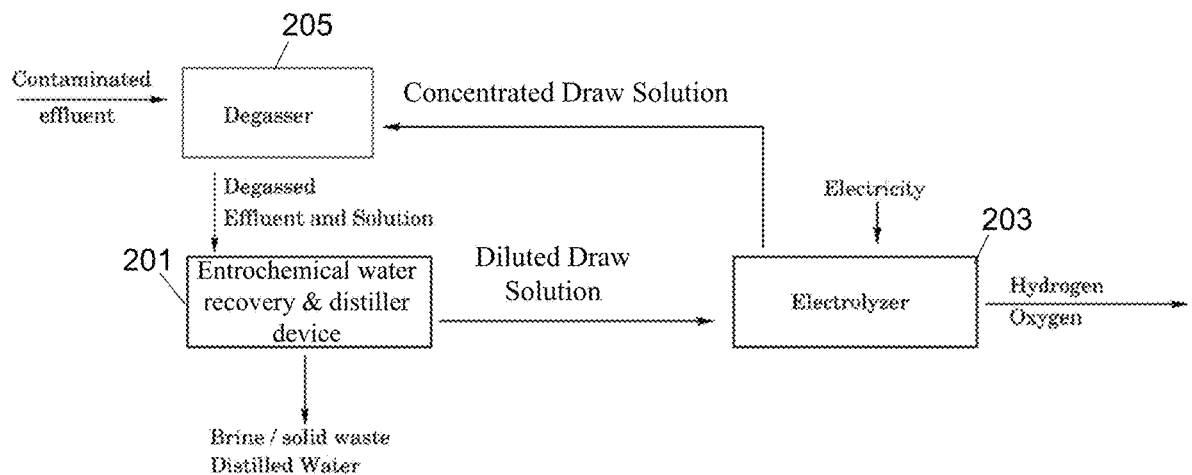
FIG. 2 shows a process diagram for utilizing an entrochemical water recovery and distiller device to acquire water from a contaminated effluent and to generate two product streams (i.e. a distilled water recovery stream and a dilute draw solution stream to the electrolyzer), in accordance with an embodiment of the invention.

FIG. 2 shows a process diagram (200) for utilizing an entrochemical water recovery and distiller device (201) in an entrochemical system to acquire water from a contaminated effluent and to generate two product streams (i.e. a distilled water recovery stream and an input water stream to the electrolyzer), in accordance with an alternate embodiment of the invention different from the embodiment previously described in conjunction with FIG. 1.

The entrochemical system in this embodiment comprises the entrochemical water recovery and distiller device (201), a degasser (205), and an electrolyzer unit (203), with pipes or conduits to transfer liquids among the three devices. The entrochemical water transfer and recovery device (201) incorporates one or more entrochemical cells and/or amplifiers, which have been previously described and illustrated in association with FIG. 3 and FIG. 5. Furthermore, the entrochemical water recovery and distiller device (201) may incorporate an internal structure of an exemplary entrochemical distiller device (400) of FIG. 4.

As illustrated in FIG. 2, the entrochemical water recovery and distiller device (201) takes a degassed contaminated effluent as a feedstock liquid and generates a diluted draw solution, as a result of a novel entrochemical process that transfers the water and thermal energy within one or more entrochemical cells contained in the entrochemical water recovery and distiller device (201). This device can also operate as a liquid distiller to generate purified water as an additional product stream, which may be a separate output of the entrochemical water recovery and distiller device (201), in addition to the diluted draw solution provided to the electrolyzer unit (203) as a primary product stream. The entrochemical water recovery and distiller device (201) receives a degassed and concentrated draw solution from the electrolyzer unit (203) in a feedback loop, after a degassing process provided by the degasser (205), for accommodating continuous entrochemical processes within the entrochemical water recovery and distiller device (201).

The liquid concentration differences between the contaminated effluent feedstock and the concentrated draw solution looped back into the entrochemical water recovery and distiller device (201) from the electrolyzer (203) enables the entrochemical cell(s) in the entrochemical water recovery and distiller device (201) to drive the entrochemical process involving liquid and thermal energy transfers, which in turn generate the diluted draw solution and distilled water as two output product streams, while separating the water from the resultant brine and/or solid wastes contained in the processed contaminated effluent. In one embodiment of the invention, the separation of brine and/or solid wastes may also involve particulate filtering assisted by gravity and/or motorized liquid agitations.

As shown in the process diagram (200) in FIG. 2, the diluted draw solution output by the entrochemical water recovery and distiller device (201) is then fed into the electrolyzer unit (203), which performs electrolysis with supplied electricity to transform the diluted draw solution into hydrogen and oxygen. The process of electrolyzing the diluted draw solution largely consumes the transferred water content in the diluted draw solution, thus concentrating the draw solution in the electrolyzer unit (203). This concentrated draw solution is degassed by the degasser (205) and then fed back into the entrochemical water recovery and distiller device (201) to enable the entrochemical process continuously with the incoming contaminated effluent, as shown in the process diagram (200).

Figure 4:
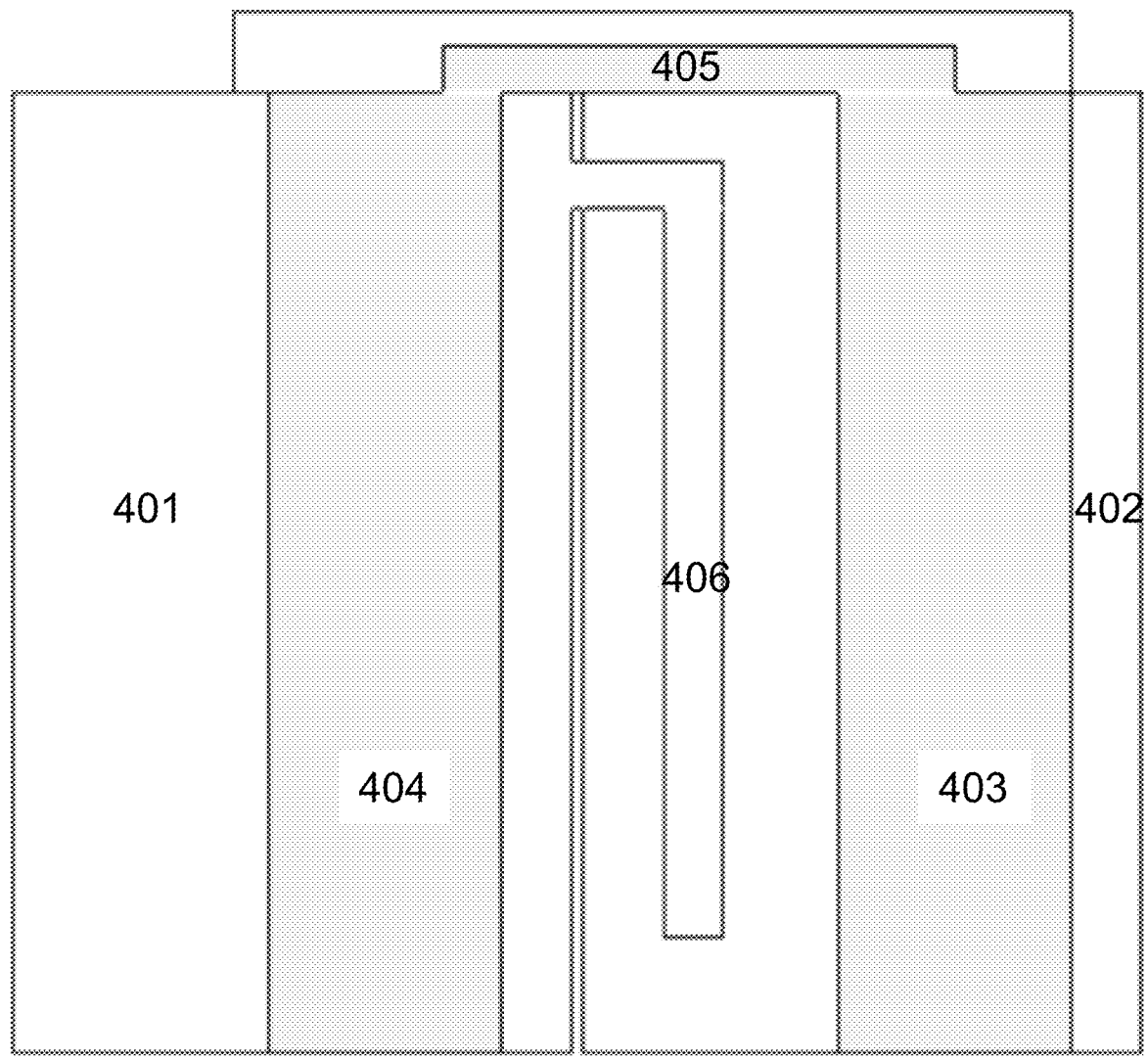
FIG. 4 shows an embodiment of an entrochemical distiller, in accordance with an embodiment of the invention.

Furthermore, the entrochemical water recovery and distiller device (201) utilizes a vapor-mediated membrane-free forward osmosis process to transfer water from the contaminated effluent to the concentrated draw solution. The energy utilized in generating the hydrogen and oxygen in the electrolyzer unit (203) lowers the entropy of the draw solution as it becomes more concentrated. This concentrated draw solution, when fed back into the entrochemical water recovery and distiller device (201) as shown in the process diagram (200), enables acquisition of the water from the contaminated effluent because the transfer of water from the effluent into the concentrated draw solution increases the overall entropy in the entrochemical cell(s) in the entrochemical water recovery and distiller device (201). Therefore, the entrochemical system embodied in the process diagram (200) of FIG. 2 does not require external extra energy other than environmental thermal energy to overcome the loss of the heat of mixing for water acquisition, distillation, and/or processing from the contaminated effluent; the energy required to drive the entire process is ultimately provided by the energy supplied to the electrolyzers FIG. 4 shows an embodiment of an entrochemical distiller device (400), in accordance with an embodiment of the invention. The entrochemical distiller device (400) is a thermal distiller in which the thermal gradient driving the distillation of a fluid is provided by an entrochemical device. As illustrated in FIG. 4, this particular entrochemical distiller device (400) utilizes a single entrochemical cell, which comprises an effluent chamber (401) and a draw solution chamber (402) and a vapor transfer channel (406) hermetically sealed and connecting the effluent and draw solution chambers (401, 402). In this embodiment, the vapor transfer channel (406) acts as liquid agitator when the surface of the draw solution placed in the draw solution chamber (402) is above the end of the vapor transfer channel. A first distiller vessel (404) is the colder-side distiller vessel and is contained in the effluent chamber (401), while a second distiller vessel (403) is the warmer-side distiller vessel and is contained in the draw solution chamber (402). Water placed within the warmer-side distiller vessel (403) vaporizes and travels through a passageway (405) and condenses in the colder-side distiller vessel (404), returning heat transferred during the entrochemical process and allowing its reuse.

In a preferred embodiment of the invention, the entrochemical process involves effluent in the effluent chamber (401) and the warmer-side distiller vessel (403), with the concentrated draw solution in the draw solution chamber (402) and providing a wet vacuum environment within the entire entrochemical distiller device (400). The water transfers from the effluent chamber (401) to the draw solution chamber (402) while carrying heat. This entrochemical thermal transfer process continues as long as the concentration of the draw solution exceeds that of the effluent with some effluent still remaining in the colder-side distiller vessel (403). Distilled water is recovered from the colder-side distiller vessel (404). While FIG. 4 illustrates a preferred embodiment of an entrochemical distiller device design, one of ordinary skill in the art can readily extend this representative embodiment to various other embodiments by utilizing the novel entrochemical process described herein.

In a preferred embodiment of the invention, the vapor transfer channels (405, 406) may each contain a turbine. As the vapor moves through the channels, it passes the turbine, imparting some of the momentum contained within the moving fluid to the turbine and causing it to turn. The turning of the turbine can be used to provide information about the vapor flow, generate electricity, mechanically move a connected apparatus, or otherwise utilize the imparted mechanical energy.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for producing hydrogen and oxygen from an effluent, the method comprising the steps of:
    transferring water from the effluent to the concentrated draw solution by creating a wet vacuum within each entrochemical cell containing the effluent and the concentrated draw solution with a higher solute concentration than the effluent in one or more entrochemical cells of an entrochemical water transfer and recovery device, wherein the effluent is placed in an effluent chamber and the concentrated draw solution is placed in a draw solution chamber per each entrochemical cell, and wherein the water in the effluent transfers into the concentrated draw solution spontaneously, once the wet vacuum is established within each entrochemical cell, through a vapor-mediated forward osmosis process, which is enhanced in some cases by mechanical agitation of the concentrated draw solution;
    generating a diluted draw solution containing condensed water vapors from the effluent through vaporization of water from the effluent and condensation of water vapors into the concentrated draw solution in the wet vacuum created within each entrochemical cell;
    transferring the diluted draw solution produced by the entrochemical water transfer and recovery device, which is an entrochemical thermal ring, to an electrolyzer connected to the entrochemical water transfer and recovery device;
    generating hydrogen and oxygen through electrolysis in the electrolyzer with the diluted draw solution originating from the entrochemical water transfer and recovery device; and
    transferring the concentrated draw solution from the electrolyzer to the entrochemical water transfer and recovery device to establish an energy-efficient feedback loop in hydrogen and oxygen production with the effluent as a feedstock liquid.

2. The method of claim 1, wherein the degasser is connected to the entrochemical water transfer and recovery device through a first pipe and a second pipe, wherein the first pipe transfers a degassed effluent to the entrochemical water transfer and recovery device and the second pipe transfers a degassed concentrated solution from the degasser to the entrochemical water transfer and recovery device.

3. The method of claim 1, wherein the entrochemical water transfer and recovery device and the electrolyzer are connected to each other through a concentrated draw solution pipe and a dilute draw solution pipe.

4. The method of claim 1, wherein the one or more entrochemical cells of the entrochemical water transfer and recovery device further include one or more turbines to provide electrical power generation during the steps of transferring water from the effluent and into the concentrated draw solution in the one or more entrochemical cells.

5. The method of claim 1, wherein the entrochemical water transfer and recovery device functions as an entrochemical thermal battery.

6. The method of claim 1, wherein the entrochemical water transfer and recovery device is an entrochemical thermal ring.

7. The method of claim 1, wherein the entrochemical water transfer and recovery device is configured to separate or filter at least one of brine and solid waste from the effluent during the steps of transferring water from the effluent into the concentrated draw solution in the one or more entrochemical cells.

8. The method of claim 1, wherein the effluent chamber and the draw solution chamber create a hermetically-sealed environment when connected together by a vapor transfer channel.

9. A method for producing distilled water, hydrogen, and oxygen from an effluent, the method comprising the steps of:
- transferring water from the effluent by creating a wet vacuum within each entrochemical cell in one or more entrochemical cells of an entrochemical water recovery and distiller device, wherein the effluent is placed in an effluent chamber and a concentrated draw solution is placed in a draw solution chamber, per each entrochemical cell, and once the wet vacuum is created within the entrochemical cell, a vapor-mediated forward osmosis-based transfer of water into the concentrated draw solution is initiated when the water is vaporized from the effluent and is subsequently condensed into the concentrated draw solution;
- generating a diluted draw solution, as a first product stream of the entrochemical water recovery and distiller device, wherein the diluted draw solution contains additional water drawn from the effluent through vaporization from the effluent and condensation of water vapors into the concentrated draw solution;
- generating distilled water, as a second product stream of the entrochemical water recovery and distiller device, through thermal gradients developed during the vaporization and condensation of water in the effluent in the wet vacuum, wherein the entrochemical water recovery and distiller device structurally includes a colder-side distiller vessel in the effluent chamber and a warmer-side distiller vessel in the draw solution chamber of the entrochemical cell to provide water distillation through a vapor passageway between the colder-side distiller vessel and the warmer-side distiller vessel during the forward osmosis-based transfer of water from the effluent inside each entrochemical cell;
- transferring the diluted draw solution produced by the entrochemical water recovery and distiller device to an electrolyzer connected to the entrochemical water recovery and distiller device;
- generating hydrogen and oxygen through electrolysis in the electrolyzer with the diluted draw solution originating from the entrochemical water recovery and distiller device; and
- transferring the concentrated draw solution from the electrolyzer to the entrochemical water recovery and distiller device to establish an energy-efficient feedback loop in hydrogen and oxygen production with the effluent as a feedstock liquid.

10. The method of claim 9, wherein the degasser is connected to the entrochemical water transfer and recovery device through a first pipe and a second pipe, wherein the first pipe transfers a degassed effluent to the entrochemical water transfer and recovery device and the second pipe transfers a degassed concentrated solution from the degasser to the entrochemical water transfer and recovery device.

11. The method of claim 9, wherein the entrochemical water transfer and recovery device is connected to the electrolyzer through a dilute draw solution pipe, and wherein the electrolyzer is connected to the degasser through a concentrated draw solution pipe.

12. The method of claim 9, wherein the one or more entrochemical cells of the entrochemical water recovery and distiller device further include one or more turbines to provide electrical power generation during the steps of transferring the water from the effluent and into the concentrated draw solution in the one or more entrochemical cells.

13. The method of claim 9, wherein the entrochemical water recovery and distiller device is configured to separate or filter at least one of brine and solid waste from the effluent during the steps of transferring water from the effluent into the concentrated draw solution in the one or more entrochemical cells.

* * * * *